(12) United States Patent
Ou-Young

(10) Patent No.: US 6,477,944 B1
(45) Date of Patent: Nov. 12, 2002

(54) MOLDING DEVICE FOR PASTRY PRODUCTS

(76) Inventor: Robert Ou-Young, P.O. Box No. 6-57, Chung-Ho, Taipei 235 (TW)

( * ) Notice: Subject to any disclaimer, the term of this patent is extended or adjusted under 35 U.S.C. 154(b) by 0 days.

(21) Appl. No.: 10/155,180

(22) Filed: May 28, 2002

(51) Int. Cl.[7] ............................. A21C 3/10; A21C 9/06; A21C 11/00; A21D 8/00
(52) U.S. Cl. ................... 99/450.2; 99/450.1; 99/450.6; 99/450.7; 425/132; 425/142; 425/287; 425/308
(58) Field of Search ....................... 99/353–355, 450.1, 99/450.2, 450.6, 450.7, 450.8, 516, 494; 425/132, 142, 287, 308, 309, 466, 131.1, 133.1, 297–299; 426/496, 499, 503, 512, 516, 517; 264/167

(56) References Cited

U.S. PATENT DOCUMENTS

| | | | | |
|---|---|---|---|---|
| 4,517,785 A | * | 5/1985 | Masuda | 99/450.6 |
| 4,608,918 A | * | 9/1986 | Funabashi et al. | 99/450.7 X |
| 4,692,109 A | * | 9/1987 | Hayashi et al. | 425/308 |
| 4,734,024 A | * | 3/1988 | Taashiro | 425/132 |
| 4,806,087 A | * | 2/1989 | Hayashi | 99/450.6 |
| 4,832,961 A | * | 5/1989 | Aoki | 99/450.7 |
| 4,883,678 A | * | 11/1989 | Tashiro | 426/503 X |
| 5,081,917 A | * | 1/1992 | Masuda | 99/450.2 |
| 5,098,273 A | * | 3/1992 | Tashiro | 425/132 |
| 5,153,010 A | * | 10/1992 | Tashiro | 425/287 |
| 5,156,869 A | * | 10/1992 | Otsuki | 426/237 |
| 5,190,770 A | * | 3/1993 | Tashiro | 425/142 X |
| 5,290,577 A | * | 3/1994 | Tashiro | 99/450.6 |

* cited by examiner

Primary Examiner—Timothy F. Simone

(57) ABSTRACT

A molding device for pastry products includes an upper rotary disc, a set of cutting tools and a central through hole formed at the front aspect of a cutting edge portions of a plurality of cutting tools; wherein the intermittently obverse and reverse rotations of the upper rotary disc on a bottom disc drives a front moving rod to displace in a long through hole and makes a rear moving rod rotate in obverse and reverse directions in a circular through hole so as to further work as a rotary shaft thereby enabling the cutting edge portions of pluralities of cutting tools synchronously to close or open the central through hole with more precise carry-over moment to achieve the effect of opening and closing the central through hole more precisely and steadily for ensuring a consistent shape of a cut noodle or a molded food product.

3 Claims, 8 Drawing Sheets

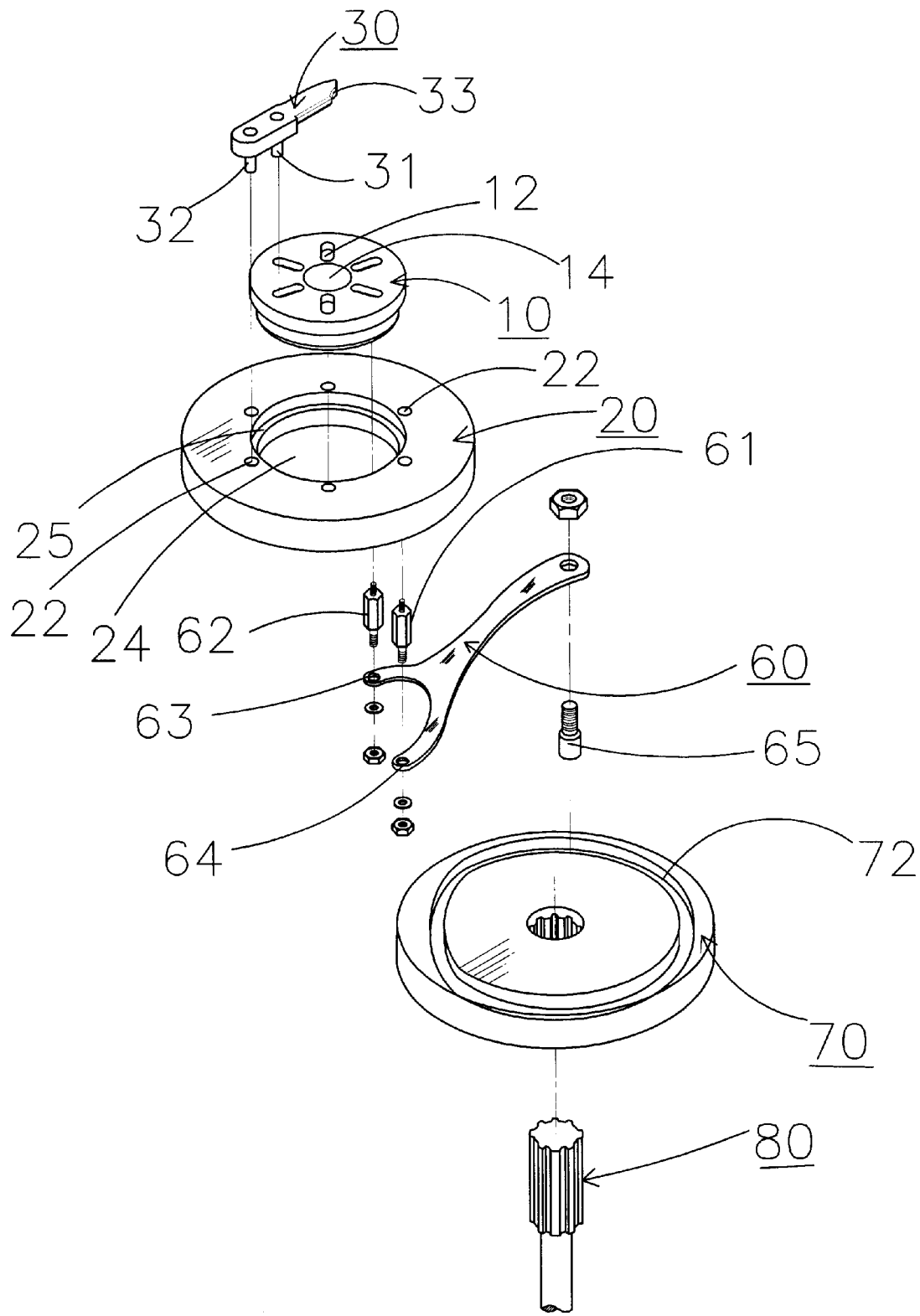
Fig:1

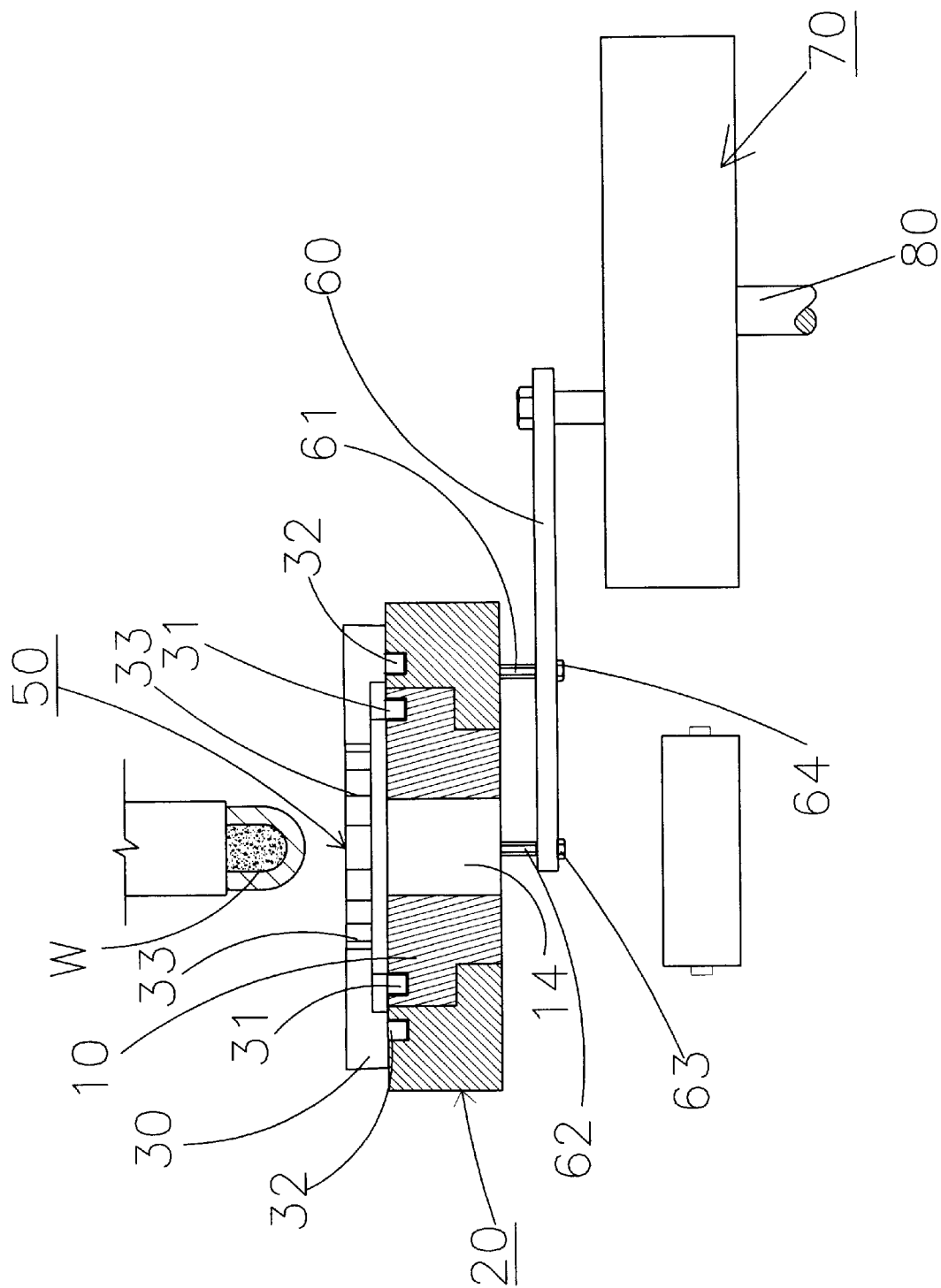
Fig:2A

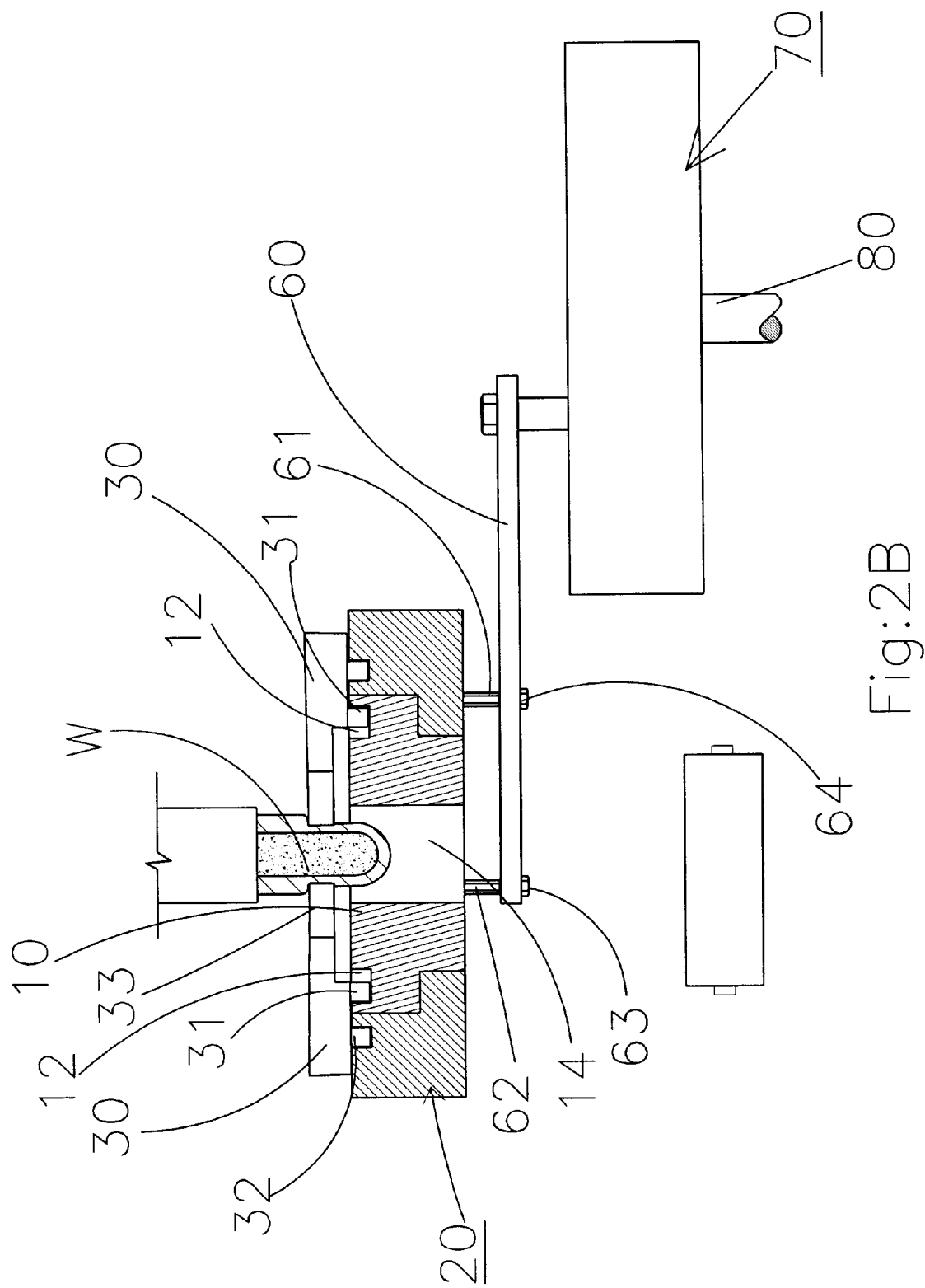
Fig:2B

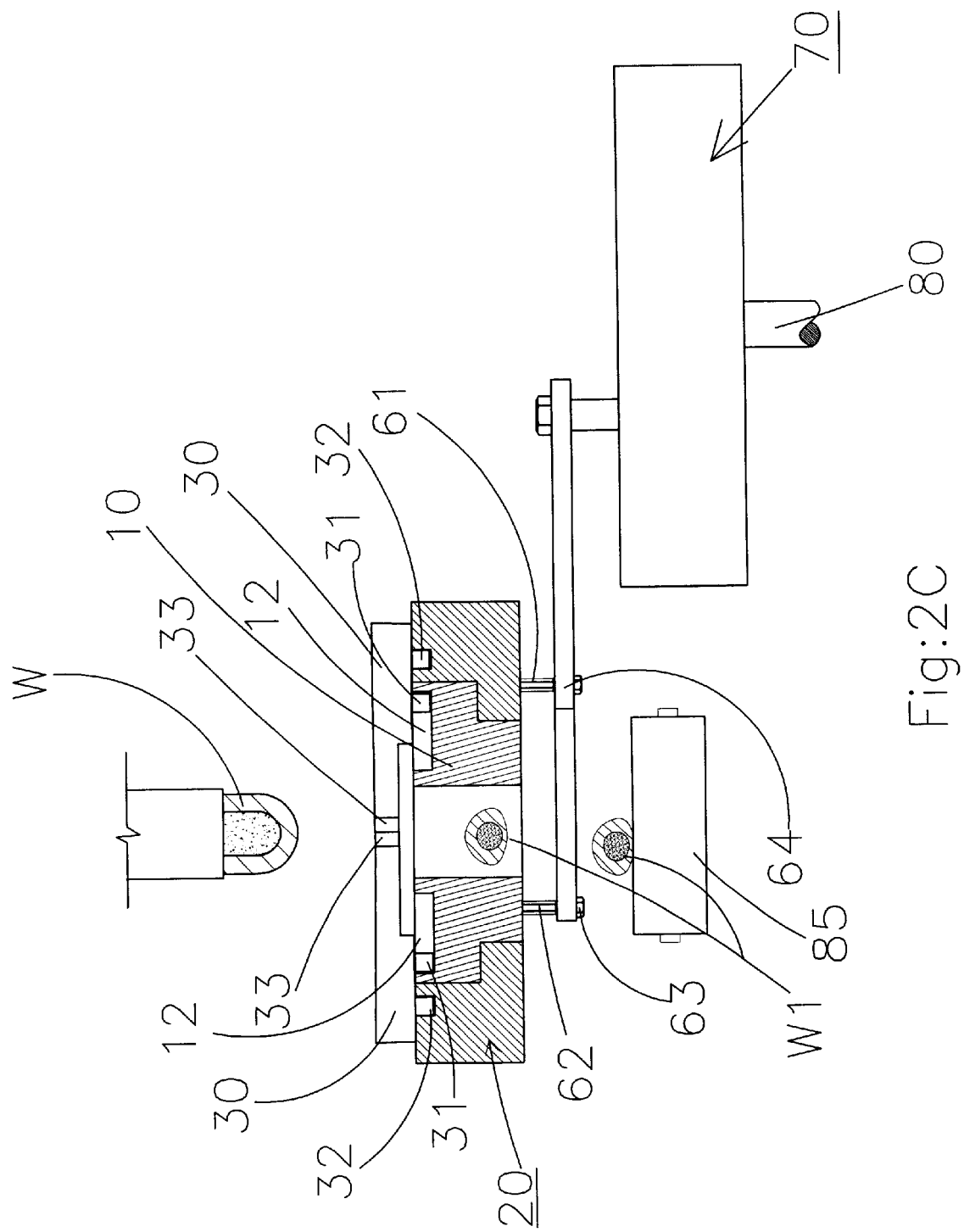
Fig:2C

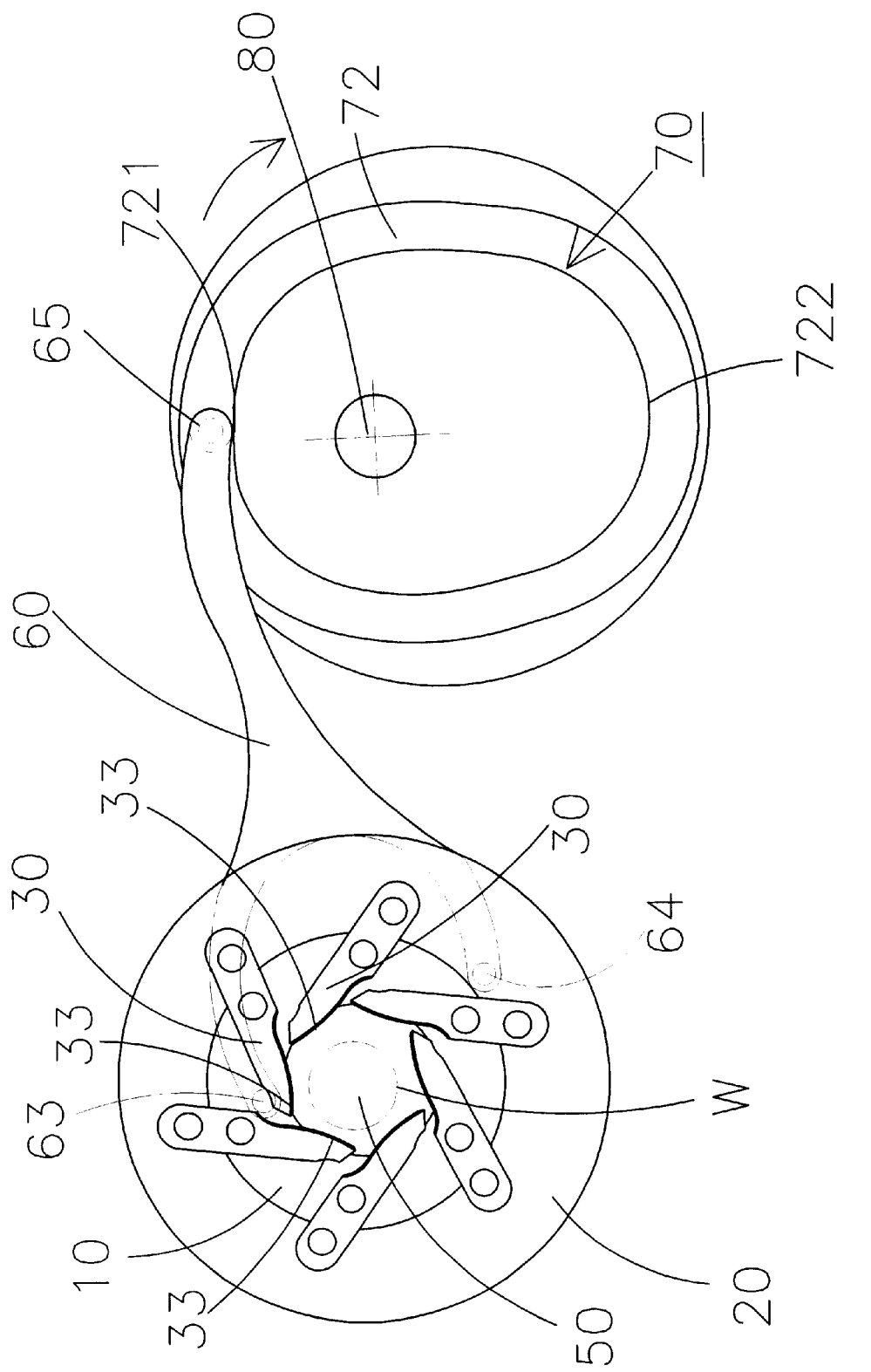
Fig:3A

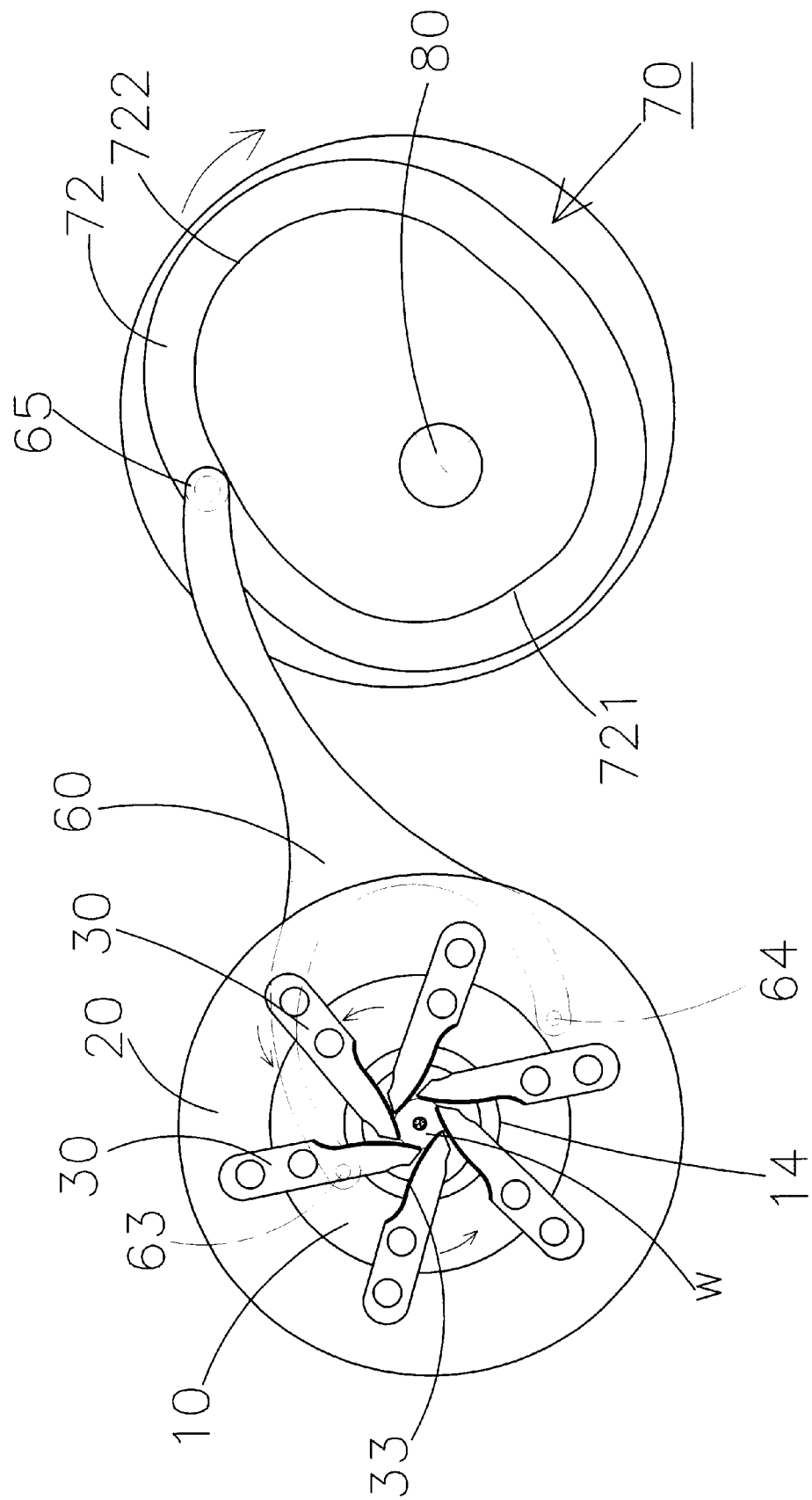
Fig:3B

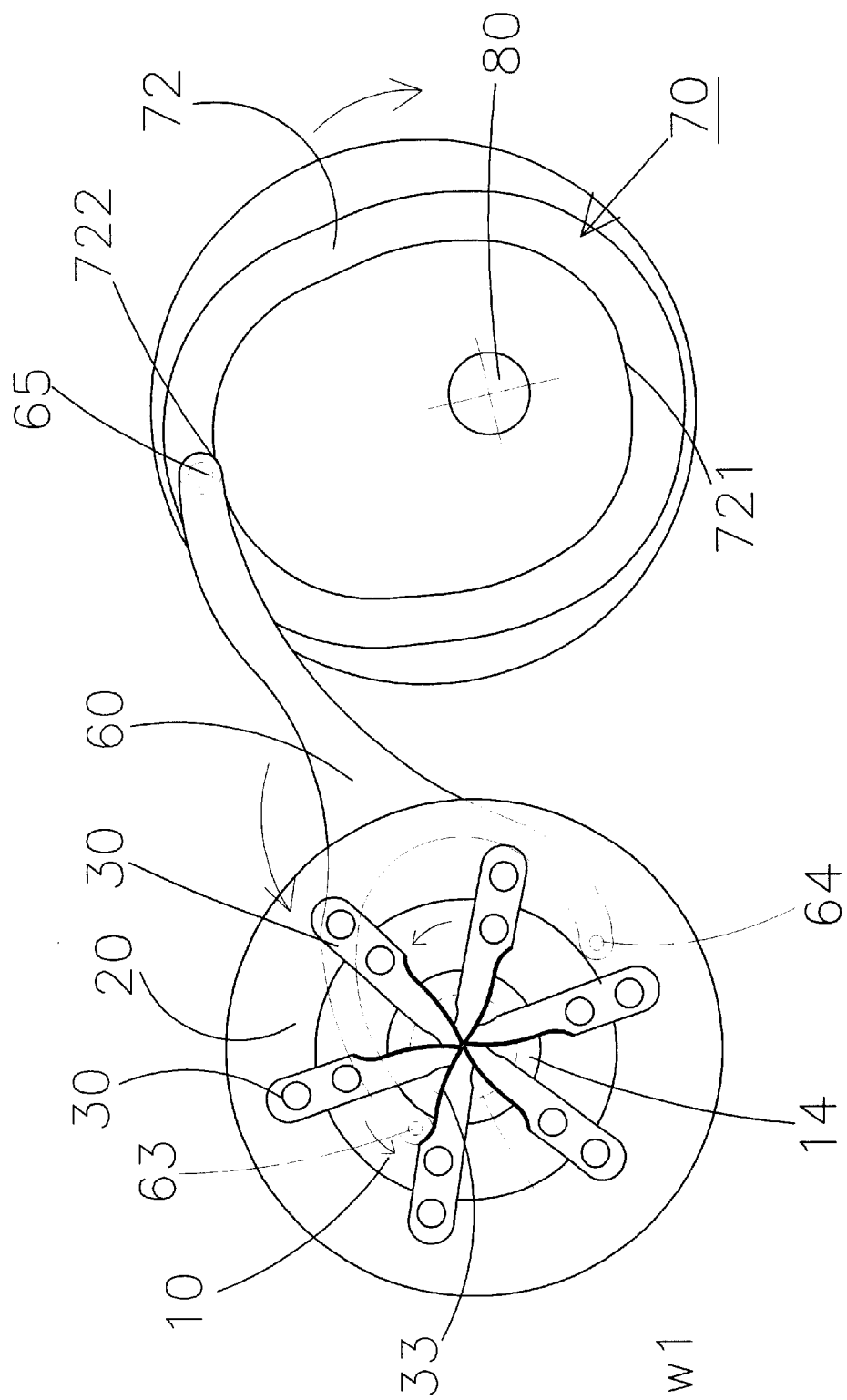
Fig:3C

MOLDING DEVICE FOR PASTRY PRODUCTS

BACKGROUND OF THE INVENTION

1) Field of the Invention

The present invention relates to a molding device for pastry products, more specifically to a cutting tool closes and opens a central through hole steadily so as to synchronously cut off noodles and mold food products in spherical shapes.

2) Description of the Prior Art

In the disclosure of "Manufacturing Device for Moldable Food Products" of Taiwan Patent NO. 270080, the closing or opening of a set of cutting tools is controlled by a set of connecting rods connected on the bottom portion of the cutting tools; a pivot joint hole located at the center of the cutting tool works as a rotating shaft hole. A rotary wheel drives the connecting rod to make the set of cutting tools close or open a central through hole thereby cutting noodles and mold food products in a spherical or almost spherical shape. However, using pluralities of connecting rods to carry over moment causes individual cutting tool to receive unequal moment; that usually results in incomplete closure of the central through hole, inefficient noodle cutting or independent spherical shape molding.

In the disclosure of "Manufacturing Device for Moldable Food Products" of Taiwan Patent NO. 239066, the closing and opening of cutting tools thereof also use a plurality of connecting rods to drive cutting tools thereby having the same shortcomings of the previously mentioned patent.

In view of the abovementioned disadvantages, how to make a set of cutting tools synchronously carry over moment with steadiness while closing and opening a central through hole was the searched issue of the present invention.

SUMMARY OF THE INVENTION

Therefore, the primary objective of the present invention is to provide a molding device for pastry products capable of using a plurality of cutting tools to synchronously close or open a central through hole with more precise carry-over moment so as to achieve the effect of opening and closing the central through hole more precisely and steadily for ensuring a consistent shape of a cut noodle or a molded food product.

To enable a further understanding of the structural features and the technical contents of the present invention, the brief description of the drawings below is followed by the detailed description of the preferred embodiment.

BRIEF DESCRIPTION OF THE DRAWINGS

FIG. 1 is an exploded drawing of component parts of the present invention.

FIG. 2A is a cross-sectional and schematic drawing of an exemplary embodiment of a set of cutting tools of the present invention opening a central through hole.

FIG. 2B is a cross-sectional and schematic drawing of an exemplary embodiment of the set of cutting tools of the present invention starting to work on noodles.

FIG. 2C is a cross-sectional and schematic drawing of the set of cutting tools of the present invention cutting noodles and molding a spherical food product.

FIG. 3A is a plane schematic drawing of the set of cutting tools of the present invention opening the central through hole.

FIG. 3B is a plane schematic drawing of the set of cutting tools of the present invention closing the central through hole.

FIG. 3C is a plane schematic drawing of the set of cutting tools of the present invention after closing a central through hole.

DETAILED DESCRIPTION OF THE PREFERRED EMBODIMENTS

Figure 4:
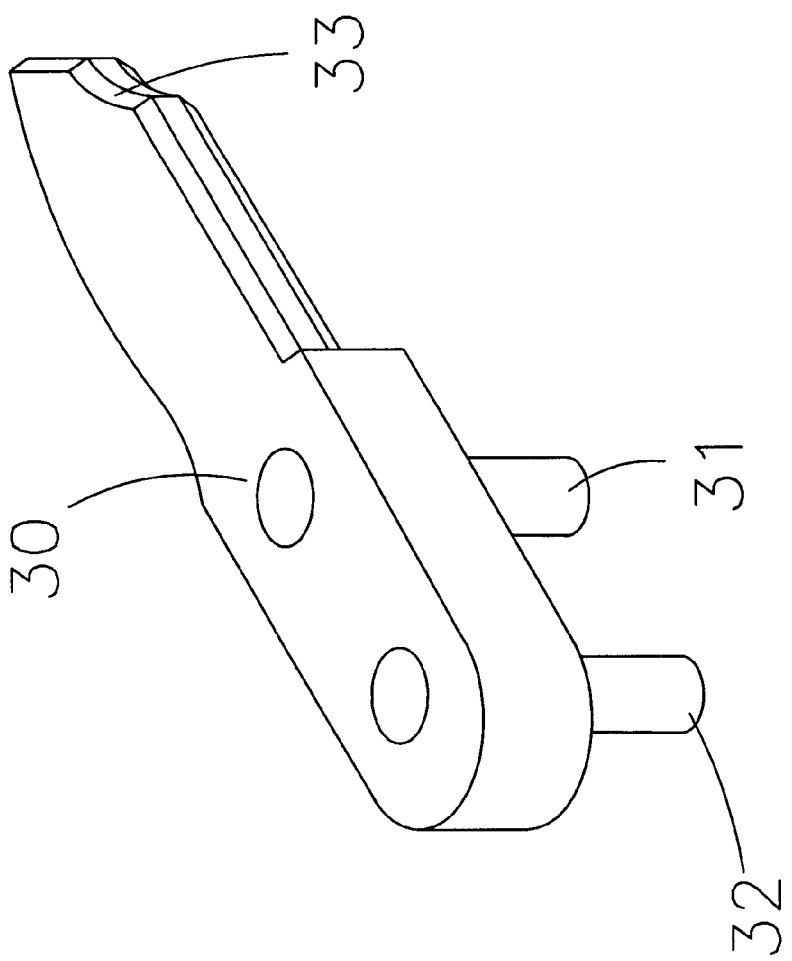
FIG. 4 is an exploded drawing of the set of cutting tools of the present invention.

Referring to FIG. 1 and FIG. 3A, the present invention comprises an upper rotary disc (10) slidably engaged onto a fixed and unmovable bottom disc (20); a set of cutting tools (30) has front and rear moving rods (31, 32) fixedly jointed on the bottom portion thereof; the front moving rod (31) movably inserts into a long through hole (12) disposed on the upper rotary disc (10); the rear moving rod (32) movably inserts into a circular through hole (22) disposed on the peripheral surface of the bottom disc (20). Furthermore, a central through hole (50) is formed at the front aspect of cutting edge portions (33) of pluralities of cutting tools (30), wherein the intermittently obverse and reverse rotation of the upper rotary disc (10) on the bottom disc (20) drives the front moving rod (31) to displace in the long through hole (12) and makes the rear moving rod (32) rotate in obverse and reverse directions in the circular through hole (22) so as to further work as a rotary shaft thereby enabling the cutting edge portions (33) of pluralities of cutting tools (30) synchronously to close or open the central through hole (50).

Based on the abovementioned primary features, wherein on the bottom disc (20), a circular through hole (24) is disposed and the peripheral rim side thereof is further disposed with a concave circular plane (25) for receiving the upper rotary disc (10). The upper rotary disc (10) slides on the concave circular plane (25) and has a circular through hole (14) communicating with the central through hole (50).

Based on the abovementioned primary features, wherein two connecting rods (61, 62) are connected on proper positions on the bottom portions of the upper rotary disc (10) and the bottom disc (20). The connecting rods (61, 62) movably connects two connecting ends (63, 64) of a Y-shaped rod (60), wherein the rear end of the Y-shaped rod (60) connects a small pulley (65) which slidably engages in an arcuate groove (72) of a cam (70). When the cam (70) rotates, the small pulley (65) slides on different arcuate positions in the arcuate groove (72) to cause the Y-shaped rod (60) to reciprocate in oscillating and displacing movements thereby enabling the connecting end (63) of the Y-shaped rod (60) to drive the upper disc (20) to rotate in obverse and reverse reciprocations on the concave circular plane (25) via the connecting rod (62). The other connecting end (64) uses the other connecting rod (61) as a supporting point of a rotating shaft to idle.

The cam (70) cascades a driving shaft (80) which rotates by the power of a motor to drive the cam (70) to rotate, as shown in FIGS. 2A and 3A; when the cam (70) rotates clockwise, the small pulley (65) locates at the most concave portion (721) of the arcuate groove (72), the central through hole (50) is opened the most. As indicated in FIG. 3B, the cam (70) continues to rotate, the small pulley (65) leaves the concave portion (721) and slides toward the arcuate groove (72) with a larger radian to make the Y-shaped rod (60) oscillates to displace. The front connecting end (63) drives the connecting rod (62) rotates at a certain angle; the rear connecting end (64) uses the connecting rod (61) as a supporting point to rotate only but not displace. Therefore, the upper rotary disc (10) rotates and displaces on the concave circular plane (25). At this moment, the long through hole (12) also rotates and displaces synchronously with the upper rotary disc (10). The wall plane of the long through hole (12) squeezes and exerts force to the front moving rod (31) to make it displace relatively in the long through hole (12).

At this time, the rear connecting end (64) uses the connecting rod (61) as a supporting point of a rotary shaft to rotate but not displace; the bottom disc (20) is fixed and doesn't move. Therefore, when the upper rotary disc (10) rotates at a certain angle, pluralities of cutting tools (30) rotate synchronously with it. This rotation uses the rear moving rod (32) as a rotary shaft to deflect at a certain angle thereby enabling the cutting edge portions (33) of pluralities of cutting tools (30) to seal toward the central through hole (50). As shown in FIG. 3C, the small pulley (65) locates at the arcuate convex portion (722) in the arcuate groove (72) of the cam (70) and increases the displacement angle of the Y-shaped rod (60) thereby driving the upper rotary disc (10) to rotate continuously and further aggregate the cutting edge portions (33) of the cutting tools (30) to seal the central through hole and cut noodles (W) and mold spherical food products (W1).

FIG. 2B shows the schematic cross-section of the noodles (W) cut by pluralities of cutting tools (30), wherein the relative position of the front moving rod (31) in the long through hole (12) is obvious to see and its moving principle is the same as in FIG. 3. FIG. 2C shows that pluralities of cutting tools (30) close the central opening (50), cut the noodles (W) and mold the spherical food products (W1). It shows the relative position of the front moving rod (31) in the long through hole (12), wherein the molded spherical food products (W1) fall on a conveyer belt for delivery.

FIG. 4 shows that in order to decorate different patterns on the surfaces of the molded spherical food products, the cutting edge portions (33) of the cutting tools (30) of the present invention can be designed in various shapes.

In summation of the abovementioned, when pluralities of cutting tools (30) of the present invention are driven by the upper rotary disc (10), each cutting tool (30) synchronously obtains a driving rotation moment and the force exertion from each cutting tool (30) is the same. Therefore, pluralities of cutting tools (30) close or open the central through hole (50) very precisely and steadily. Whether the noodles (W) are made from hard or soft flour, the cutting tools (30) are capable of cutting the noodles (W) and molding spherical food products (W1). The present invention is advanced and innovative.

It is of course to be understood that the embodiment described herein is merely illustrative of the principles of the invention and that a wide variety of modifications thereto may be effected by persons skilled in the art without departing from the spirit and scope of the invention as set forth in the following claims.

I claim:

1. A molding device for pastry products comprising:

an upper rotary disc slidably engages onto a fixed and unmovable bottom disc;

a set of cutting tools has front and rear moving rods fixedly jointed on the bottom portion thereof; the front moving rod movably inserts into a long through hole disposed on the upper rotary disc; the rear moving rod movably inserts into a circular through hole disposed on the peripheral surface of the bottom disc;

a central through hole is formed at the front aspect of cutting edge portions of pluralities of cutting tools, wherein the intermittently obverse and reverse rotation of the upper rotary disc on the bottom disc drives the front moving rod to displace in the long through hole and makes the rear moving rod rotate in obverse and reverse directions in the circular through hole so as to further work as a rotary shaft thereby enabling the cutting edge portions of pluralities of cutting tools synchronously to close or open the central through hole.

2. A molding device for pastry products according to claim 1, wherein the circular through hole is disposed on the bottom disc and the peripheral rim side thereof is disposed with a concave circular plane for receiving the upper rotary disc to rotate thereon; a circular through hole is disposed at the center of the upper rotary disc to communicate with the central through hole.

3. A molding device for pastry products according to claim 1, wherein two connecting rods are connected on proper positions on the bottom portions of the upper rotary disc and the bottom disc; the connecting rods movably connects two connecting ends of a Y-shaped rod, wherein the rear end of the Y-shaped rod connects a small pulley which is slidably jointed in an arcuate groove of a cam; when the cam rotates, the small pulley slides on different arcuate positions in the arcuate groove to cause the Y-shaped rod to reciprocate in oscillating and displacing movements thereby enabling one connecting end of the Y-shaped rod to drive the upper disc to rotate in obverse and reverse reciprocations on the concave circular plane via the connecting rod; the other connecting end uses the other connecting rod as a supporting point of a rotating shaft to idle.

\* \* \* \* \*